United States Patent
Tashiro et al.

(10) Patent No.: US 8,314,844 B2
(45) Date of Patent: Nov. 20, 2012

(54) IMAGE PICKUP APPARATUS, METHOD AND COMPUTER-READABLE STORAGE MEDIUM FOR PROCESSING AN IMAGE BASED ON USER MANIPULATION ON A DISPLAY SURFACE

(75) Inventors: Kazuya Tashiro, Osaka (JP); Nobuyuki Mori, Osaka (JP)

(73) Assignee: Sony Corporation, Tokyo (JP)

( * ) Notice: Subject to any disclaimer, the term of this patent is extended or adjusted under 35 U.S.C. 154(b) by 385 days.

(21) Appl. No.: 12/466,069

(22) Filed: May 14, 2009

(65) Prior Publication Data

US 2009/0295944 A1 Dec. 3, 2009

(30) Foreign Application Priority Data

Jun. 3, 2008 (JP) ................. 2008-145699

(51) Int. Cl.
*H04N 5/228* (2006.01)
(52) U.S. Cl. ................ 348/222.1; 348/231.99; 348/239; 348/246; 382/275
(58) Field of Classification Search ............. 348/231.99, 348/222.1, 239, 246; 382/275
See application file for complete search history.

(56) References Cited

U.S. PATENT DOCUMENTS

| | | | | |
|---|---|---|---|---|
| 5,596,346 A | * | 1/1997 | Leone et al. | 345/667 |
| 6,160,923 A | * | 12/2000 | Lawton et al. | 382/275 |
| 6,791,608 B1 | * | 9/2004 | Miyazawa | 348/246 |
| 2007/0183771 A1 | | 8/2007 | Takanashi et al. | |
| 2007/0195185 A1 | * | 8/2007 | Onuki | 348/333.02 |
| 2008/0240608 A1 | * | 10/2008 | Ishii | 382/275 |
| 2008/0304765 A1 | * | 12/2008 | Gyotoku | 382/275 |
| 2009/0256947 A1 | * | 10/2009 | Ciurea et al. | 348/333.12 |
| 2010/0074554 A1 | * | 3/2010 | Gyotoku | 382/275 |

FOREIGN PATENT DOCUMENTS

| | | |
|---|---|---|
| JP | 2004-184949 | 7/2004 |
| JP | 2007-241171 | 9/2007 |
| JP | 2007-243651 | 9/2007 |

\* cited by examiner

*Primary Examiner* — Chieh M Fan
*Assistant Examiner* — Antoinette Spinks
(74) *Attorney, Agent, or Firm* — Oblon, Spivak, McClelland, Maier & Neustadt, L.L.P.

(57) ABSTRACT

Disclosed herein is an image pickup apparatus, including: an image pickup portion configured to capture an image; a detecting portion configured to detect a manipulation made on a display surface, for the image displayed on a display portion; and a grid and dust removing portion configured to carry out removal of grid and dust an image of which appears on the captured image by executing image processing based on a position about the manipulation detected by the detecting portion.

13 Claims, 8 Drawing Sheets

IMAGE PICKUP APPARATUS, METHOD AND COMPUTER-READABLE STORAGE MEDIUM FOR PROCESSING AN IMAGE BASED ON USER MANIPULATION ON A DISPLAY SURFACE

BACKGROUND OF THE INVENTION

1. Field of the Invention

The embodiments of the present invention relate to an image pickup apparatus including an image pickup device for capturing an image of a subject.

2. Description of the Related Art

With regard to a digital camera (image pickup apparatus) for photographing an image of a subject with an image pickup element, single-lens reflex type one for which one lens can be interchanged with another one is also known.

However, in such a single-lens reflex digital camera, there is the possibility that a dust invading into the inside of a camera body during lens interchange, or grid and dust such as a metallic powder generated in a drive mechanism such as a reflex mirror adhere to an optical component or part such as an image pickup element or a lens.

Here, when the grid and dust adhere to the image pickup element or the like, an image of the grid and dust appears on a photographed image of a subject. In order to take the measures to cope with this problem, the techniques, for example, disclosed in Japanese Patent Laid-Open Nos. 2004-184949, 2007-241171 and 2007-243651 are proposed.

According to the technique disclosed in Japanese Patent Laid-Open No. 2004-184949, the floating grid and dust are negatively charged by a charging device disposed within a mirror box, and a dust correcting plate positively charged attracts the negatively charged grid and dust by the coulombic force, thereby suppressing the adhesion of the grid and dust to the optical component or part.

According to the technique disclosed in Japanese Patent Laid-Open No. 2007-241171, an air flow is generated in front of an image pickup element by a piezoelectric pump, thereby suppressing the adhesion of the grid and dust to the optical component or part.

Also, according to the technique disclosed in Japanese Patent Laid-Open No. 2007-243651, a white image is previously photographed to create a dust profile, and an image of the grid and dust appearing on the photographed image is removed by executing image processing based on the dust profile.

SUMMARY OF THE INVENTION

However, with the above techniques disclosed in Japanese Patent Laid-Open Nos. 2004-184949 and 2007-241171, although the adhesion of the grid and dust to the optical component or part can be physically suppressed, the adhesion of the grid and dust may not be perfectly prevented. As a result, there is the possibility that the image of the grid and dust appears on the photographed image of the subject. Under such circumstances, it may be impossible to obtain the photographed image from which the image of the grid and dust is suitably removed.

On the other hand, with the technique disclosed in Japanese Patent Laid-Open No. 2007-243651, although the creation of the dust profile makes it possible to remove the grid and dust, it is necessary for the creation of the dust profile to previously photograph the white image. As a result, it may be impossible to easily remove the grid and dust.

The present invention has been made in the light of the problems described above, and it is therefore desirable to provide an image pickup apparatus in which an image of grid and dust appearing on a photographed image of a subject can be easily removed.

In order to attain the desire described above, according to an embodiment of the present invention, there is provided an image pickup apparatus including: an image pickup portion configured to capture an image; a detecting portion configured to detect a manipulation, made on a display surface, for the image displayed on a display portion; and a grid and dust removing portion configured to carry out removal of grid and dust an image of which appears on the captured image by executing image processing based on a position about the manipulation detected by the detecting portion.

According to another embodiment of the present invention, there is provided a computer-readable recording medium having a program recorded therein, the program being adapted to instruct a computer to execute the steps of: capturing an image; detecting a manipulation, made on a display surface, for the image displayed on a display portion; and carrying out removal of grid and dust an image of which appears on the image by executing image processing based on a position about the detected manipulation.

According to still another embodiment of the present invention, there is provided an image processing method including the steps of: capturing an image; detecting a manipulation, made on a display surface, for the image displayed on a display portion; and carrying out removal of a grid and dust an image of which appears on the image by executing image processing based on a position about the detected manipulation.

According to the embodiments of the present invention, the position of the image of the grid and dust appearing on the captured image is specified based on the position, about the manipulation, detected by the detecting portion, and the grid and dust the image of which appears on the photographed image is removed by executing the image processing based on the specified position of the grid and dust. As a result, it is possible to carry out the suitable removal of the image, of the grid and dust, which appears on the photographed image.

DETAILED DESCRIPTION OF THE PREFERRED EMBODIMENTS

Construction of Image Pickup Apparatus

Figure 1:
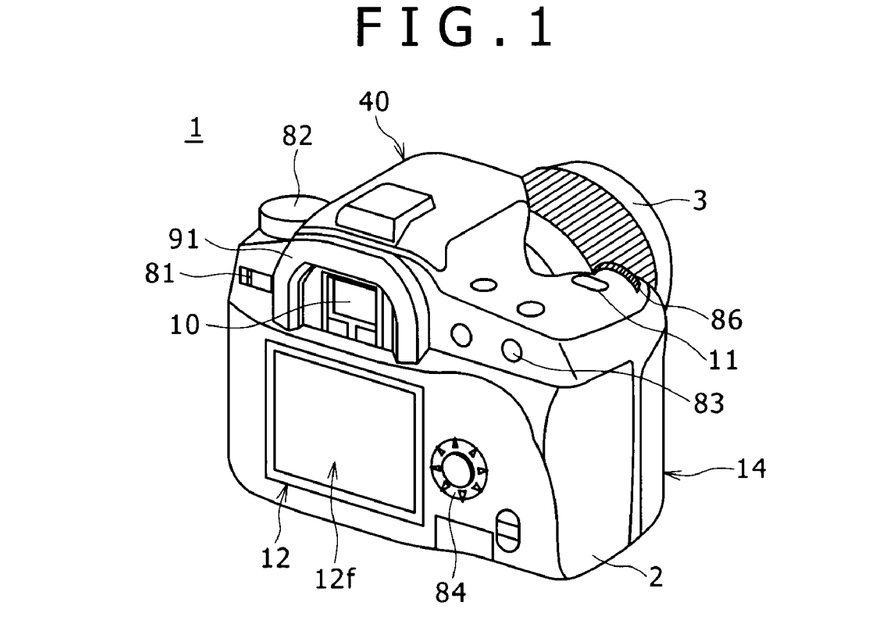
FIG. 1 is a perspective view showing a construction of a main portion of an image pickup apparatus according to an embodiment of the present invention.

FIG. 1 is a perspective view showing a construction of a main portion of an image pickup apparatus 1 according to an embodiment of the present invention. This image pickup apparatus 1 is constructed in the form of a single-lens reflex type digital camera with interchangeable lenses.

The image pickup apparatus 1 includes a camera main body portion (camera body) 2, and an interchangeable lens (interchangeable photographing lens unit) 3 is detachably attached to the camera main body portion 2. When the interchangeable lens 3 is interchanged with a different kind of one, the photographing can be carried out with the lens having a focal length and brightness which a user desires to set. However, when the interchangeable lens 3 is interchanged with another one, grid and dust such as dust floating in an atmosphere of the outside of the camera main body 2 may invade into the inside of the camera main body 2. Also, the grid and dust invading into the inside of the camera main body 2 adheres to an image pickup element 41 (refer to FIG. 2), which results in that an image of the grid and dust appears on a photographed image.

The interchangeable lens 3 is mainly composed of a camera cone, and a lens group and a stop which are provided inside the camera cone, and the like. A focus lens which is moved in an optical axis direction, thereby changing a position of a focal point, and the like are included in the lens group functioning as a photographing optical system.

The camera main body portion 2 includes a toric mount portion to which the interchangeable lens 3 is adapted to be attached approximately at a center on a front side.

In addition, the camera main body portion 2 includes a mode setting dial 82 in a top right portion of a back surface thereof, and also includes a control value setting dial 86 in a top left portion of a front surface thereof. The mode setting dial 82 is manipulated, thereby making it possible to carry out an operation for setting various kinds of operation modes which are set in the image pickup apparatus 1. In this case, the various kinds of operation modes includes various kinds of photographing modes (such as a person photographing mode, a scene photographing mode, and a full-automatic photographing mode), a reproduction mode for reproducing a photographed image, a communication mode for carrying out data communication with an external apparatus, and the like. In addition, when the control value setting dial (hereinafter referred to as "the setting dial" as well for short) 86 is manipulated, the control values can be set in the various kinds of photographing modes. Also, an enlargement factor of an image displayed on a display screen 12f of a back surface display portion 12 can be changed in a grid and dust removal correcting mode which will be described later.

In addition, the camera main body portion 2 includes a grip portion 14 which the user is adapted to grip in a left-hand end portion of the front side. A release button 11 with which exposure start is instructed is provided in an upper surface of the grip portion 14. In addition, a battery accommodating room and a card accommodating room are both provided inside the grip portion 14. A battery as a camera power source is accommodated in the battery accommodating room, and a memory card (refer to FIG. 2) 90 for recording therein image data on a photographed image is detachably accommodated in the card accommodating room.

The release button 11 is a two-stage detecting button with which two states of a semi-depression state (state S1) and a full-depression state (state S2) can be detected. When the release button 11 is semi-depressed to provide the state S1, a preparing operation (such as an AF (Auto Focus) control operation and an AE (Auto Exposure) control operation) for capturing a still image for recording (regularly photographed image) about a subject is carried out. Also, when the release button 11 is fully depressed to provide the state S2, a photographing operation for the regularly photographed image is carried out. In this case, the photographing operation for the regularly photographed image corresponds to a series of operations for carrying out an exposure operation relating to a subject image (a light figure of the subject) is carried out by using an image pickup element 41 which will be described later, and executing predetermined image processing for an image signal obtained through the exposure operation.

The camera main body portion 2 includes a finder window (eye piece window) 10 approximately in a central upper portion of the back surface thereof. The user looks through the finder window 10, whereby the user can visually recognize the light figure of the subject guided through the interchangeable lens 3, thereby determining a composition. Here, the image pickup apparatus 1 can be loaded with an eye piece 91 for preventing an eye of the user or the like from directly contacting the finder window 10.

The camera main body portion 2 includes a built-in flash 40 in an upper portion thereof. In a phase of photographing in a dark place or the like, the user pops up the built-in flash 40 to cause the built-in flash 40 to emit a flashlight, thereby making the suitable photographing possible.

The back surface display portion 12 having the display screen 12f is provided approximately in a center of the back surface of the camera main body 2. A photographed image can be displayed on the back surface display portion 12. Also, a menu picture for setting of photographing conditions or the line can be displayed on the display screen 12f of the back surface display portion 12, and the photographed image the data on which is recorded in the memory card 90 can be reproduced and displayed on the display screen 12f of the back surface display portion 12 in a reproduction mode. In addition, a menu M1 (refer to FIG. 6) from which a grid and dust removal correcting mode set for the purpose of removing the grid and dust as the operation mode of the image pickup apparatus 1 is selected, or the like can be displayed on the display screen 12f of the back surface display portion 12 so as to be superimposed on the photographed image.

A main switch 81 is provided in a top left portion of the back surface display portion 12. The main switch 81 is composed of a two-point slide switch. When a contact point is set in a left-hand side "OFF" position, a power source is turned OFF, while when the contact point is set in a right-hand side "ON" position, the power source is turned ON.

A direction selecting key 84 is provided on a right-hand side of the back surface display portion 12. The direction selecting key 84 has a circular manipulation button. Depression manipulations for four directions of left, right, top, and bottom in the manipulation button, and depression manipulations for four directions of top right, top left, bottom right, and bottom left can be individually detected. It is noted that with the directional selecting key 84, a depression manipulation made with a push button in the central portion can also be detected in addition to depression manipulations for the eight directions described above.

Buttons 83 with which the menu display, the deletion of the image, and the like are carried out are provided in a top right portion of the back surface display portion 12.

Functional Configuration of Image Pickup Apparatus 1

Figure 2:
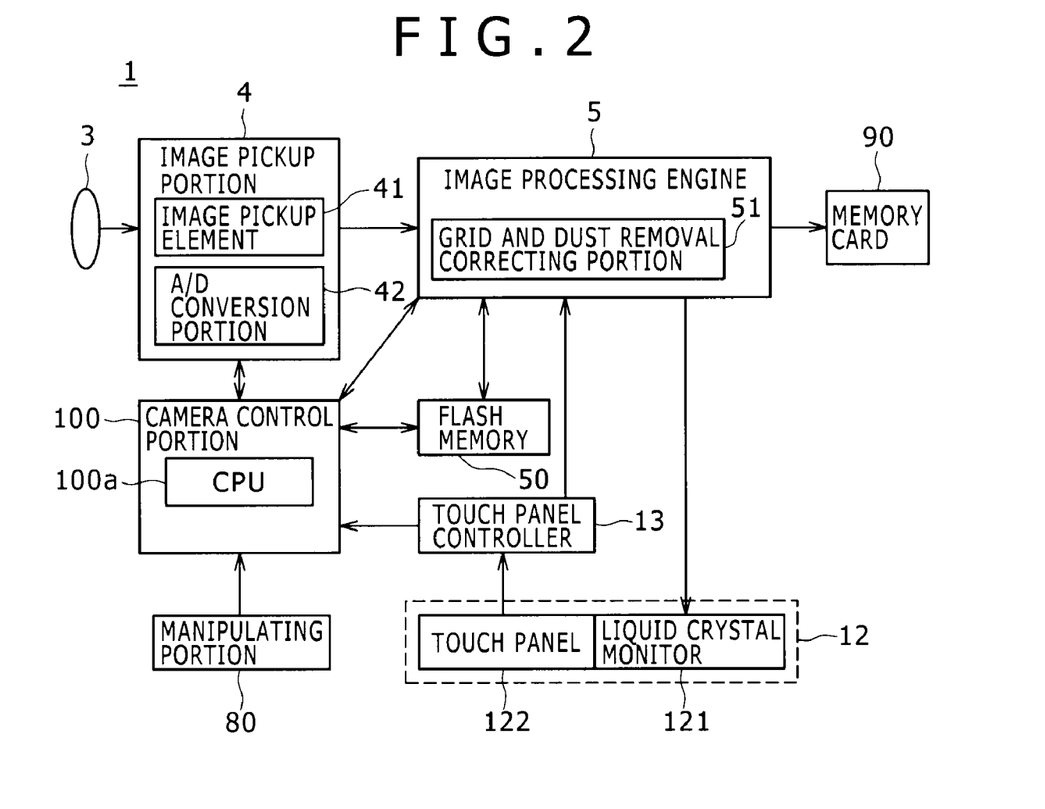
FIG. 2 is a block diagram showing a functional configuration of the image pickup apparatus shown in FIG. 1.

FIG. 2 is a block diagram showing a functional configuration of the image pickup apparatus 1 shown in FIG. 1. Here, the same portions, etc. as those in FIG. 1 are designated with the same reference numerals or symbols, respectively.

The image pickup apparatus 1 includes a camera control portion 100, an image processing engine 5, and a flash memory 50. Here, the camera control portion 100 takes charge of the control for the camera mechanism. The image processing engine 5 executes image processing for an image signal generated in an image pickup portion 4. Also, the flash memory 50 can be accessed by each of the camera control portion 100 and the image processing engine 5, and functions as a non-volatile memory.

The camera control portion 100 is a portion which has a Central Processing Unit (CPU) functioning as a microcomputer, and which carries out control or the like in the phase of the photographing operation in the image pickup apparatus 1. With the camera control portion 100, the various kinds of operations of the image pickup apparatus 1 are realized in response to an input manipulation made by the user by using a manipulating portion 80 composed of the various kinds of buttons including the release button 11 (refer to FIG. 1), a switch and the like.

The image pickup portion 4 includes an image pickup element 41, and an A/D conversion portion 42 for converting an analog signal outputted from the image pickup element 41 into a digital signal. Also, the image pickup element 41 functions as an image pickup section for capturing an image of a subject.

The image pickup element 41 is disposed in a direction vertical to an optical axis and on the optical axis of the lens group which the interchangeable lens 3 includes when the interchangeable lens 3 is attached to the camera main body portion 2. A CMOS (complementary metal-oxide semiconductor) color area sensor (CMOS type image sensor) having a Bayer disposition is used as the image pickup element 41. In this case, in the CMOS color area sensor, a plurality of pixels, for example, each having a photodiode are two-dimensionally disposed in a matrix, and color filters of, for example, Red (R), Green (G) and Blue (B) different in spectroscopical characterizations from one another are disposed at a ratio of 1:2:1 on a light receiving surface of each of pixels. Such an image pickup element 41 generates analog electrical signals (image signals) of color components of Red (R), Green (G) and Blue (B) about a light figure of the subject imaged through the interchangeable lens 3, and outputs the resulting image signals of R, G and B.

The image processing engine 5, for example, is configured in the form of an image processing circuit including a CPU functioning as a microcomputer, and a memory.

The image processing engine 5 executes various kinds of image processing such as limb darkening correction (shading correction), black level correction, and white balance correction for the image data outputted from the image pickup portion 4. In addition, the image processing engine 5 includes a grid and dust removal correcting portion 51 for removing an image of grid and dust which appears on the photographed image by executing image processing (grid and dust removal correction) (a detailed description thereof will be given later).

During the regular photographing, the image data for which the image processing is executed in the image processing engine 5 is recorded in the memory card 90 as a recording medium, and an image corresponding to the image data is displayed on the display picture 12f of the back surface display portion 12. Confirmation display (after-view) for confirming the photographed image is realized by the image display.

The back surface display portion 12 includes a liquid crystal monitor 121, for example, configured in the form of a color Liquid Crystal Display (LCD). Also, a transparent touch panel 122 which can detect a touch position where the user touches is disposed so as to cover an entire display screen 12f of the liquid crystal monitor 121. With the back surface display portion 12 configured in the manner as described above, the user can visually recognize the contents of the image or the like displayed on the liquid crystal monitor 121 through the touch panel 122.

Also, with the camera control portion 100 and the image processing engine 5, information on the coordinates of the position which the user touches in the touch panel 122 provided on the display screen 12f can be acquired through a touch panel controller 13.

With Respect to Removal of Grid and Dust

In the image pickup apparatus 1, the position of the image of the grid and dust in the photographed image can be specified based on the touch position detected by the touch panel 122 while the photographed image is displayed on the display screen 12f of the back surface display portion 12, and the suitable grid and dust removal can be carried out in accordance with the grid and dust removal correction based on the position of the grid and dust by using the grid and dust removal correcting portion 51. A procedure of the grid and dust removal will be described hereinafter.

Firstly, the photographed image obtained in the image pickup element 41 by the regular photographing is displayed on the display screen 12f of the back surface display portion 12. Next, a portion in which the image of the grid and dust appears on the photographed image displayed on the display screen 12f of the back surface display portion 12 is specified by the user manipulation made for the touch panel 122. Also, an image portion for which the grid and dust removal correction (a correction area Hs which will be described later (refer to FIG. 10)) is set. Also, the photographed image is obtained for which the image of the grid and dust is suitably removed by the grid and dust removal correction using a correction level which increases depending on a time period for which the user touches the touch panel 122. The grid and dust removal correction using the correction level will be described in detail hereinafter.

When the correction level α is set, a luminance value of one pixel specified as the position of the image of the grid and dust by the user is used as a reference value R, and a pixel having a luminance value falling within a threshold value of (the reference value R± the correction level α) is regarded as an abnormal pixel, and thus becomes an aim of the grid and dust removal correction.

Figure 3:
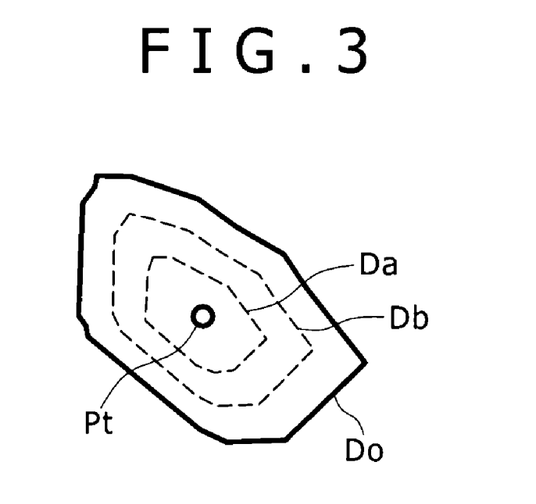
FIG. 3 is a view explaining grid and dust removal correction.

That is to say, in the grid and dust removal correcting portion 51, a pixel group belonging to the luminance range (R±α) set depending on the time period for the touch for the touch panel 122 is regarded as a pixel group composing the image of the grid and dust in the photographed image (hereinafter referred to as "a grid and dust composing pixel group") to be detected. For example, in the case where an image Do of grid and dust (indicated by a heavy line) appears on a photographed image as shown in FIG. 3, when the correction level α increases depending on the time period for touch for the touch panel 122 (press time period), a range of the grid and dust composing pixel group spreads from an area Da to an entire area of the image Do of the grid and dust via an area Db with a specified position Pt of the image of the grid and dust specified by the user as a center. As a result, the user can easily input the correction level as a correction parameter necessary for the grid and dust removal correction. It is noted that the information on the specified position Pt of the image Do of the grid and dust, the correction area and the correction level which are set by the user manipulation made for the touch panel 122 is stored in the flash memory 50 so as to be able to be utilized as the correction parameter in the grid and dust removal correction for the photographed image obtained in the follow-on regular photographing.

Figure 4A:
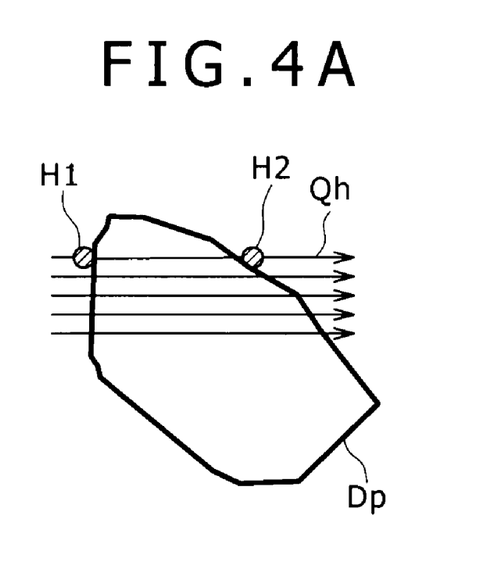
FIGS. 4A and 4B are respectively views explaining grid and dust removal correction.
Figure 4B:
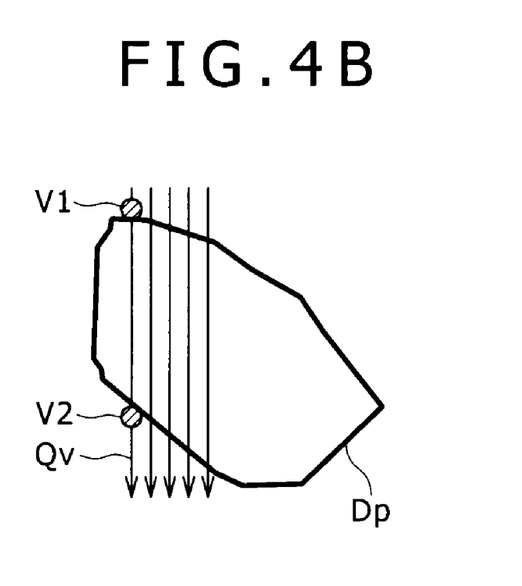

In addition, in the grid and dust removal correction, horizontal scanning for the photographed image as shown in FIG. 4A, and vertical scanning as shown in FIG. 4B can be switched over to each other by an input manipulation made by the user. For example, while the position of the image Do of the grid and dust is touched on the touch panel 122 with the finger FG to be specified, a direction along which the finger FG moves after touch (a direction along which the finger is wielded sideways) is detected. Also, it is judged whether the direction is the horizontal direction or the vertical direction, thereby determining the scanning direction. Here, when horizontal scanning Qh is carried out as shown in FIG. 4A, there is executed the correction processing for replacing each of luminance values of the pixel group sandwiched between pixels H1 and H2 with an average of luminance values of the normal pixels H1 and H2 each being adjacent to an outer edge of the area Dp of the grid and dust composing pixel group. Likewise, when vertical scanning Qv is carried out as shown in FIG. 4B, there is executed the correction processing for replacing each of luminance values of the pixel group sandwiched between pixels V1 and V2 with an average of luminance values of the normal pixels V1 and V2 each being adjacent to the outer edge of the area Dp of the grid and dust composing pixel group. The photographed image from which the image of the grid and dust is suitably removed is obtained by executing the correction processing described above.

A concrete operation of the image pickup apparatus 1 capable of carrying out the removal of the grid and dust as described above will be described below.

Operation of Image Pickup Apparatus 1

Figure 5:
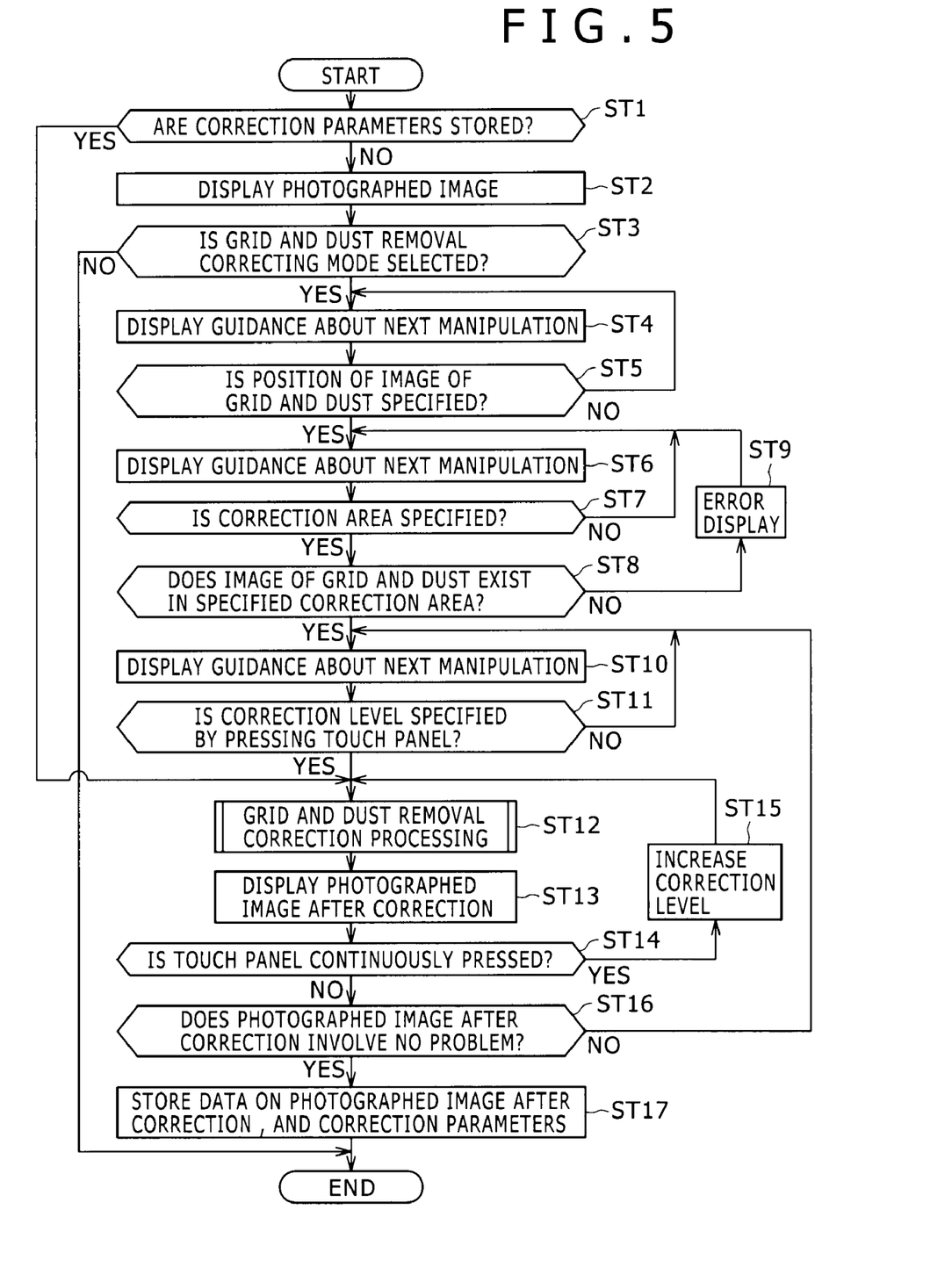
FIG. 5 is a flow chart explaining a basic operation of the image pickup apparatus shown in FIG. 1.

FIG. 5 is a flow chart explaining a basic operation of the image pickup apparatus 1, especially, an operation concerned with the grid and dust removal correcting processing.

Firstly, when the image of the subject is captured by the image pickup element 41 through the operation for the regular photographing, it is judged whether or not the correction parameters (the correction level described above, the position of the image of the grid and dust, and a correction area which will be described later) which can be utilized in the grid and dust removal correction are stored in the flash memory 50 (Step ST1).

When it is judged in Step ST1 that the correction parameters are stored in the flash memory 50, the operation proceeds to processing in Step ST12. As a result, in Step ST12, in response to the acquisition of the photographed image made by the image pickup element 41, the removal of the image Do of the grid and dust is automatically carried out for the photographed image thus acquired by carrying out the grid and dust removal correction based on the correction parameters (the information on the image Do of the grid and dust) stored in the flash memory 50. As a result, the convenience is enhanced.

On the other hand, when it is judged in Step ST1 that none of the correction parameters is stored in the flash memory 50, the operation proceeds to processing in Step ST2.

In Step ST2, the photographed image acquired by the image pickup element 41 is displayed on the display screen 12f of the back surface display portion 12. Here, the photographed image displayed on the display screen 12f of the back surface display portion 12 can be enlarged or reduced by the user manipulation made for the setting dial 86.

Figure 6:
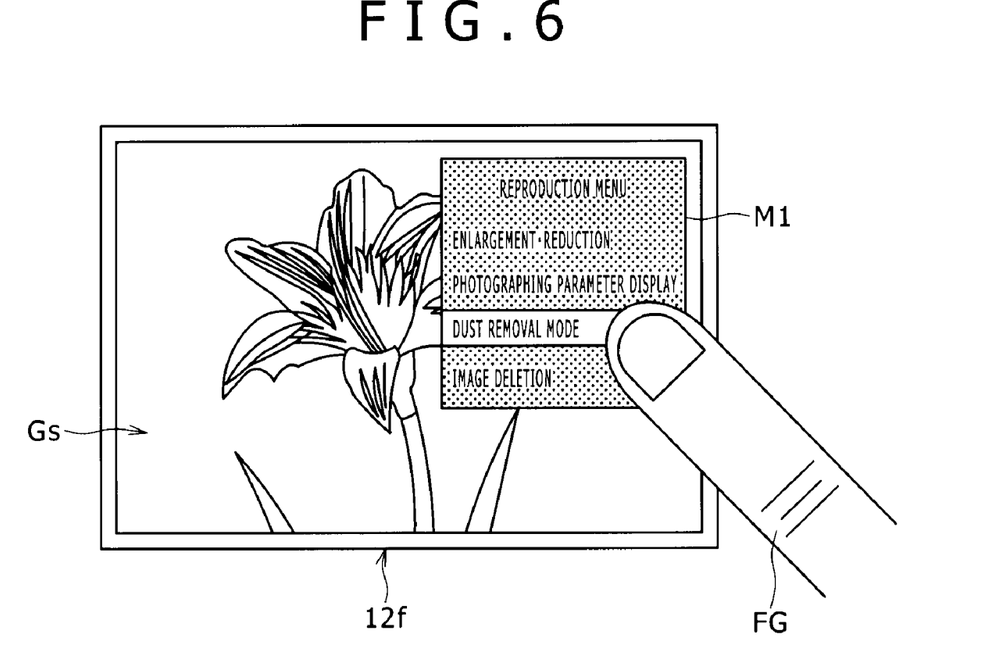
FIG. 6 is a view explaining an operation in the image pickup apparatus shown in FIG. 1.

In Step ST3, it is judged whether or not the grid and dust removal correction mode is selected. For example, as shown in FIG. 6, it is judged whether or not "DUST REMOVAL MODE" corresponding to the grid and dust removal correcting mode is selected in a menu M1 displayed on the display screen 12f of the back surface display portion 12 by the input made to the touch panel 122 by using the finger FG of the user.

When it is judged in Step ST3 that the grid and dust removal correcting mode is selected, the operation proceeds to processing in Step ST4, and processing necessary for the grid and dust removal correction is started to be executed. It is noted that after the operation proceeds to the grid and dust removal correcting mode, for example, the grid and dust removal correcting processing can be stopped by the user manipulation made for the button 83, thereby exiting the grid and dust removal correcting mode.

On the other hand, when it is judged in Step ST3 that no grid and dust removal correcting mode is selected, the operation of the flow chart shown in FIG. 5 ends.

In Step ST4, a guidance about a next user manipulation is displayed on the display screen 12f of the back surface display portion 12. For example, as shown in FIG. 7, a message M2 of "TOUCH POSITION WHERE IMAGE OF DUST EXISTS" is displayed on the display screen 12f of the back surface display portion 12.

Figure 7:
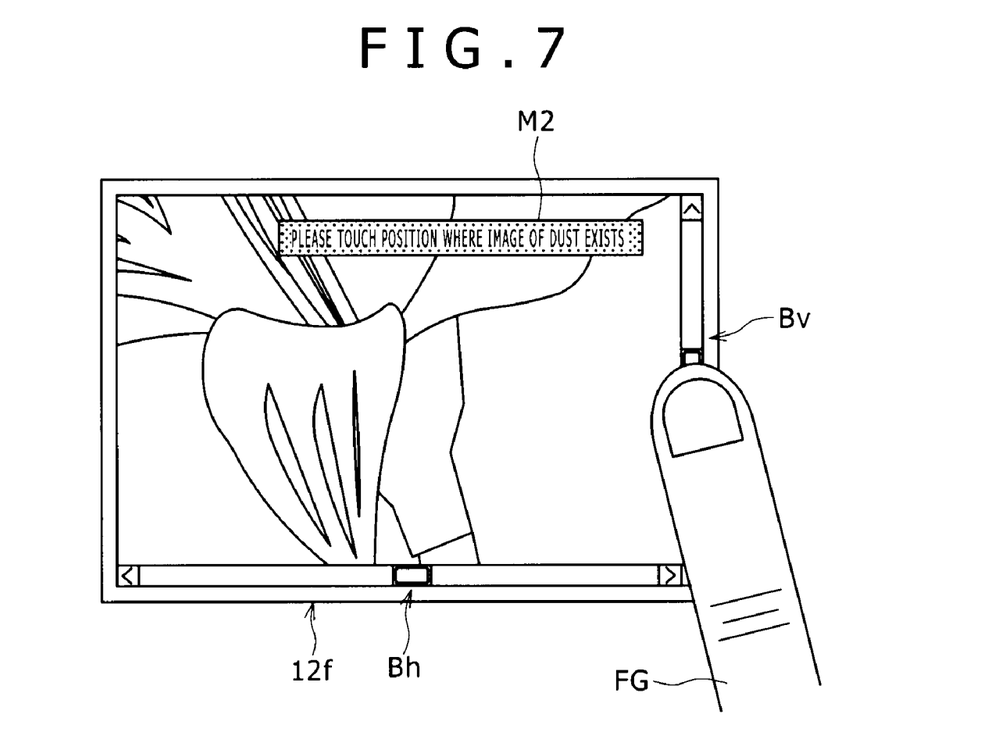
FIG. 7 is a view explaining an operation in the image pickup apparatus shown in FIG. 1.

In FIG. 7, an image obtained by enlarging a photographed image Gs shown in FIG. 6 is displayed on the display screen 12f of the back surface display portion 12. That is to say, in the image pickup apparatus 1, for the purpose of making the image of the minute grid and dust appearing on the photographed image Gs easy for the user to identify, the photographed image Gs is automatically enlarged and displayed on the display screen 12f of the back surface display portion 12 in response to the proceeding to the grid and dust removal correcting mode.

Figure 8:
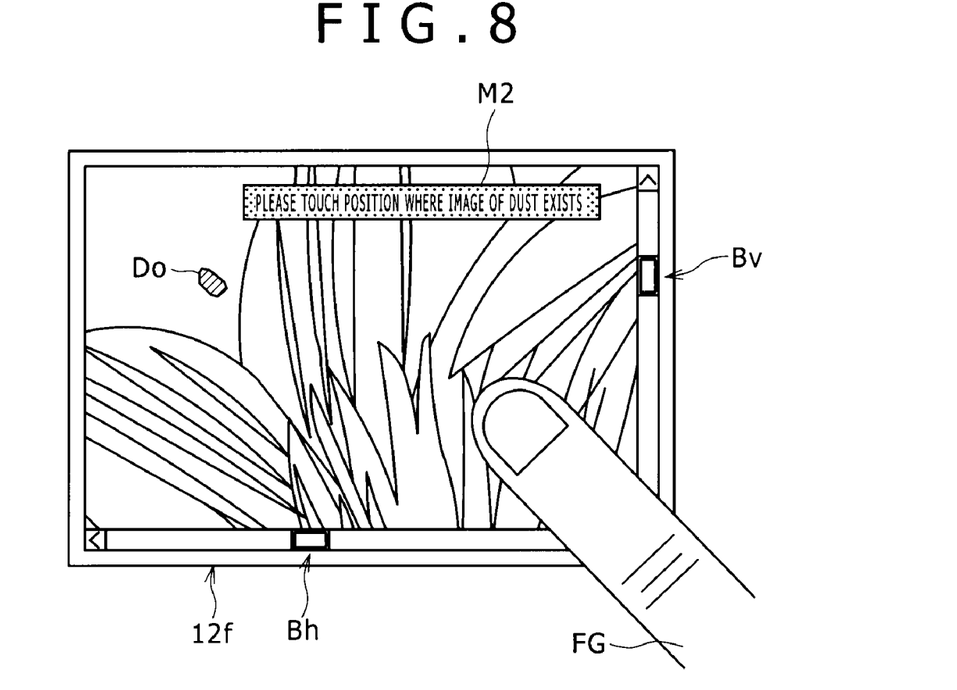
FIG. 8 is a view explaining an operation in the image pickup apparatus shown in FIG. 1.

Note that, scroll bars Bh and Bv are displayed in a lower end and a right-hand end of the display screen 12f along with the enlarged display of the photographed image Gs. In this case, the image portion enlarged and displayed in the photographed image Gs can be moved in accordance with the input made to the touch panel 122 using the scroll bars Bh and/or Bv. Also, when an image Do of the grid and dust (represented by a parallel slant portion) is displayed on the display screen 12f of the back surface display portion 12 as shown in FIG. 8 by the user manipulation made for the scroll bars Bh and/or Bv, the image Do of the grid and dust can be exactly touched with the finger FG of the user.

Figure 9:
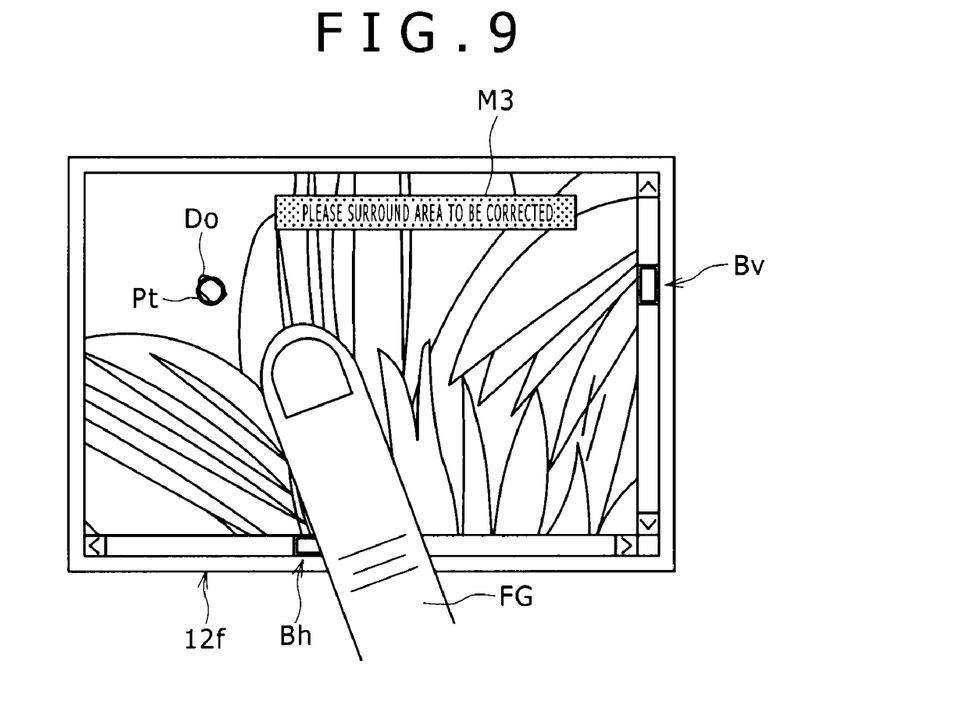
FIG. 9 is a view explaining an operation in the image pickup apparatus shown in FIG. 1.

In Step ST5, it is judged whether or not a position of the image Do of the grid and dust appearing on the photographed image Gs is specified by a press manipulation made against the touch panel 122 by the finger FG of the user. Here, when it is judged in Step ST5 that the position of the image Do of the grid and dust is specified, for example, a specified position Pt (illustrated in the form of a black circle symbol) shown in FIG. 9 is displayed, and then the operation proceeds to processing in Step ST6. On the other hand, when it is judged in Step ST5 that no position of the image Do of the grid and dust is specified, the operation returns back to the processing in Step ST4.

In Step ST6, a guidance about a next user manipulation is displayed on the display screen 12f of the back surface display portion 12. For example, as shown in FIG. 9, a message M3 of "PLEASE SURROUND AREA TO BE CORRECTED" is displayed on the display screen 12f of the back surface display portion 12.

In Step ST7, it is judged whether or not a partial area of the photographed image Gs for which the grid and dust removal correction is carried out (hereinafter referred to as "a correction area" for short) is specified by an input manipulation for making a circuit of the image Do of the grid and dust while the finger FG of the user touches the touch panel 122. The grid and dust removal correcting portion 51 can execute limited grid and dust removal correcting processing for the correction area (partial area) set in the photographed image Gs. However, as in the case of the input manipulation described above, an area having a locus obtained by circularly moving the touch position as an outer periphery on the touch panel 122 is set as the correction area, thereby making it possible to easily input the correction parameters necessary for the grid and dust removal correction.

Figure 10:
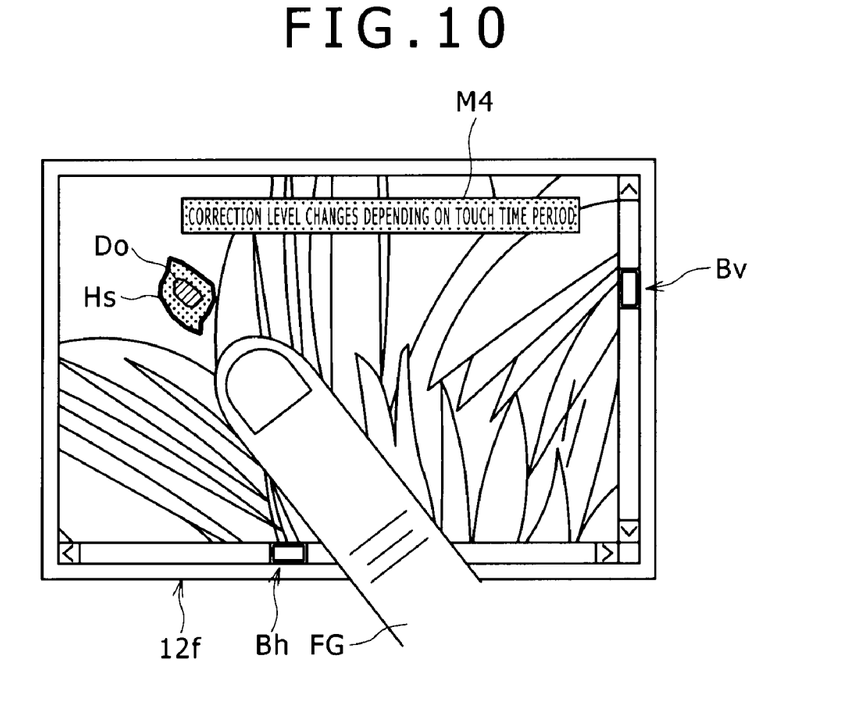
FIG. 10 is a view explaining an operation in the image pickup apparatus shown in FIG. 1.

When it is judged in Step ST7 that the correction area is specified, for example, as shown in FIG. 10, the correction area Hs (hatching portion) is displayed, and the operation proceeds to processing in Step ST8. On the other hand, when no correction area is specified, the operation returns back to the processing in Step ST6.

In Step ST8, it is judged whether or not the image Do of the grid and dust exists in the correction area Hs specified with the finger FG of the user. Specifically, it is judged in Step ST8 that the correction area HS includes a specified position Pt of the image Do of the grid and dust specified with the finger FG of the user. Here, when it is judged in Step ST8 that the image Do of the grid and dust exists in the correction area Hs, the operation proceeds to processing in Step ST10. On the other hand, when it is judged in Step ST8 that no image Do of the grid and dust exists in the correction area Hs, the operation proceeds to processing in Step ST9.

In Step ST9, error display is carried out on the display screen 12f of the back surface display portion 12 from the reason that no correction area Hs is suitably specified. For example, a message of "PLEASE SELECT AREA TO BE CORRECTED ONCE AGAIN" is displayed on the display screen 12f of the back surface display portion 12.

In Step ST10, a guidance about a next user manipulation is displayed on the display screen 12f of the back surface display portion 12. For example, as shown in FIG. 10, a message M4 of "CORRECTION LEVEL CHANGES DEPENDING ON TOUCH TIME PERIOD" is displayed on the display screen 12f of the back surface display portion 12.

In Step ST11, it is judged whether or not the correction level is specified by the press against the touch panel 122 made with the finger FG of the user. For example, when a time period for the press against the touch panel made with the finger FG of the user is longer than a predetermined threshold time period, this behavior is judged to be a specification behavior for the correction level made with the finger FG of the user. It is noted that with regard to the press manipulation made for the touch panel 122 in order to specify the correction level, the press against any portion may be available as long as any portion is included on the surface of the touch panel 122.

When it is judged in Step ST11 that the correction level is specified, the operation proceeds to processing in Step ST12.

On the other hand, when it is judged in Step ST11 that no correction level is specified, the operation returns back to the processing in Step ST11.

In Step ST12, grid and dust removal correcting processing is executed for the image Do of the grid and dust appearing on the photographed image Gs based on the correction parameters (the specified position Pt of the image Do of the grid and dust, the correction area Hs and the correction level) inputted by the user (details thereof will be described later).

In Step ST13, the photographed image, after completion of the correction, for which the grid and dust removal correcting processing is executed in Step ST12 is displayed on the display screen 12f of the back surface display portion 12.

In Step ST14, it is judged whether or not the touch panel 122 is continuously pressed with the finger FG of the user. When it is judged in Step ST14 that the touch panel 122 is continuously pressed with the finger FG of the user, the operation proceeds to processing in Step ST15. On the other hand, when it is judged in Step ST14 that no press against the touch panel 122 is carried out because the finger FG of the user gets off the touch panel 122, the operation proceeds to processing in Step ST16.

In Step ST15, the correction level is increased. By executing the processing in Step ST15, for example, the grid and dust removal correction (Step ST12) can be carried out based on the correction level which is gradually increased at a given speed, and also the photographed image for which the correction is carried out can be displayed (Step ST13). That is to say, the photographed images for which the grid and dust removal correction is carried out for the grid and dust composing pixel group obtained based on the above luminance ranges set in conjunction with the correction levels successively set based on the increase in touch time period for the touch panel 122 can be successively displayed on the display screen 12f of the back surface display portion 12. As a result, during the press against the touch panel 122, the situation in which the correction portion for the image Do of the grid and dust gradually spreads from the area Da to the area Db with the specified position Pt of the image Do of the grid and dust as the center, for example, as shown in FIG. 3 can be grasped in real time. Therefore, if the finger FG is taken off the touch panel 122 at a time point when the correction is carried out so as to reach the entire area of the image Do of the grid and dust, the suitable grid and dust removal can be carried out.

Figure 11:
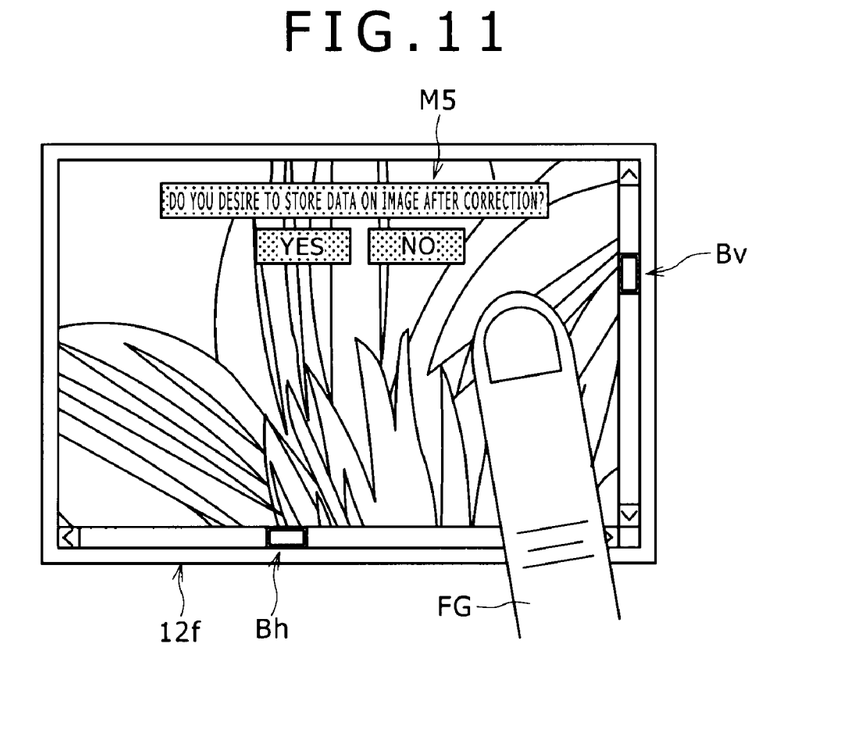
FIG. 11 is a view explaining an operation in the image pickup apparatus shown in FIG. 1.

In Step ST16, it is judged whether or not the photographed image after completion of the correction involves a problem. In this case, for example, a message M5 of "DO YOU DESIRE TO STORE DATA ON IMAGE AFTER CORRECTION?" is displayed on the display screen 12f of the back surface display portion 12 as shown in FIG. 11. Also, it is judged which of displayed portions of "YES" and "NO" the finger FG of the user touches. Here, when it is judged in Step ST16 that the photographed image after completion of the correction involves no problem, the operation proceeds to processing in Step ST17. On the other hand, when it is judged in Step ST16 that the photographed image after completion of the correction involves a problem, the operation returns back to the processing in Step ST10.

In Step ST17, the image data on the photographed image after completion of the correction is stored in the memory card 90, and the correction parameters inputted by the user are stored in the flash memory 50. That is to say, the correction parameters which are ones (grid and dust information) containing therein the specified position Pt of the image Do of the grid and dust used in the grid and dust correction processing in Step ST12, and which are newly obtained unlike ones stored in the flash memory 50 are additionally stored in the flash memory (storage device) 50. As a result, the convenience is enhanced because these correction parameters can be utilized in the grid and dust removal correction for the photographed image obtained in the follow-on photographing.

By executing the processing in Step ST17, the correction parameters are accumulated in the flash memory 50. However, when the grid and dust the image of which appears on the photographed image is physically removed by a blower or the like, the correction parameters stored in the flash memory 50 needs to be erased in order to prevent the grid and dust removal correction therefor from being automatically carried out. This erasing procedure will be described below.

Figure 12:
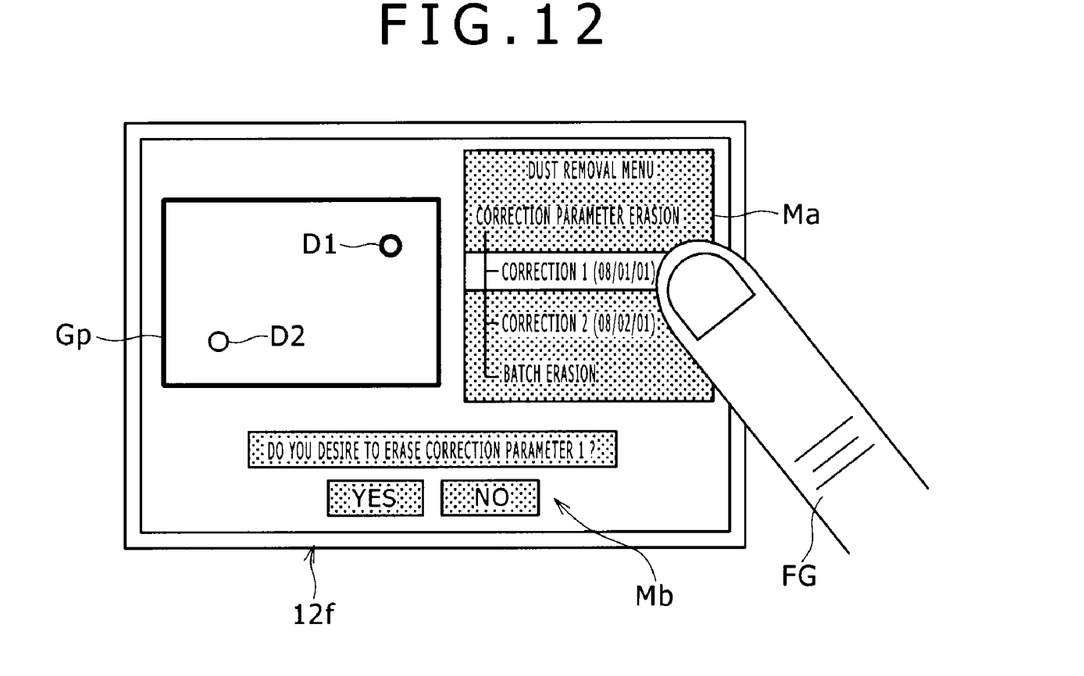
FIG. 12 is a view explaining a procedure for erasing a correction parameter from a flash memory.
Figure 13:
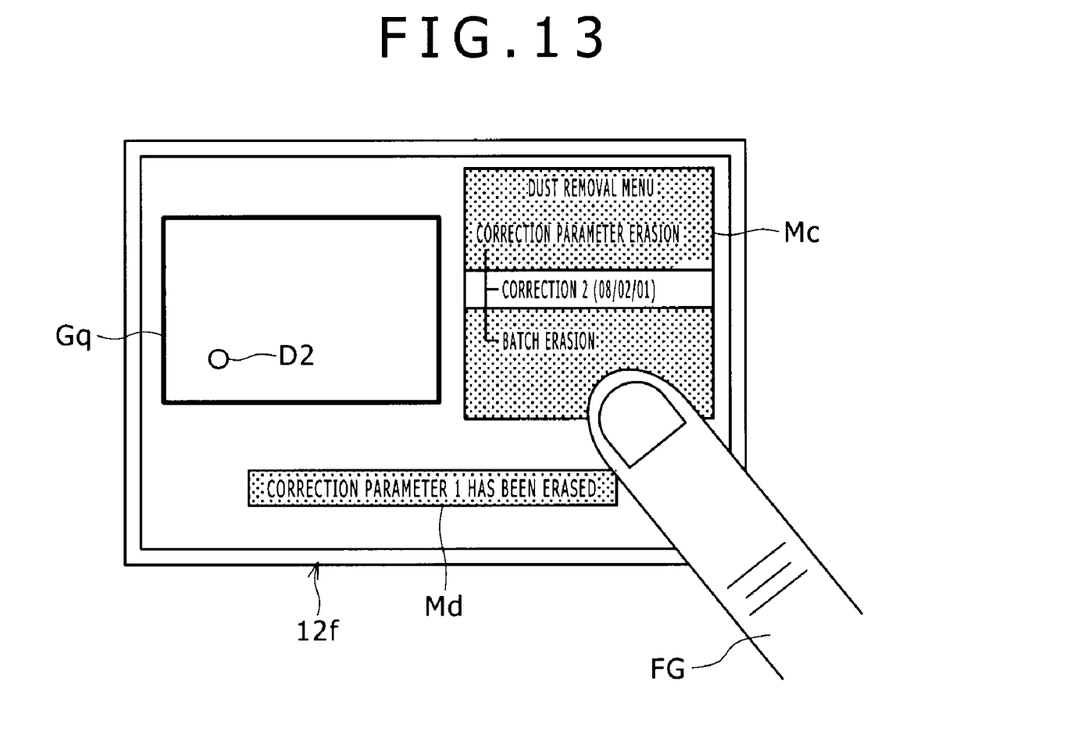
FIG. 13 is a view explaining a procedure for erasing the correction parameter from the flash memory.

FIGS. 12 and 13 are respectively views explaining a procedure for erasing the correction parameters from the flash memory 50. Hereinafter, the procedure for erasing a correction parameter 1 when the correction parameters 1 and 2 about the images of the grid and dust which exist in positions D1 and D2, respectively, in a grid and dust position display Gp representing a position of an image of grid and dust appearing on a photographed image will be described as a concrete example.

Firstly, a dust removal menu Ma is displayed on the display screen 12f of the back surface display portion 12 as shown in FIG. 12, and a displayed portion of "CORRECTION 1" is touched with the finger FG of the user. As a result, a message Mb of "DO YOU DESIRE TO ERASE CORRECTION PARAMETER 1?" is displayed on a lower portion of the display screen 12f of the back surface display portion 12. In this case, when a displayed portion of "YES" is touched with the finger FG of the user, the correction parameter 1 is erased from the flash memory 50, and a message Md of "CORRECTION PARAMETER 1 HAS BEEN ERASED" is displayed on the lower portion of the display screen 12f of the back surface display portion 12 as shown in FIG. 13. Also, a dust removal menu Mc (refer to FIG. 13) in which an item "CORRECTION 1" is erased from the display picture shown in FIG. 12, and a grid and dust position display Gq in which the position D1 of the image of the grid and dust is erased from the display picture shown in FIG. 12 are displayed along with the erasion of the correction parameter 1.

It is noted that when "BATCH ERASION" is selected in the dust removal menu Ma shown in FIG. 12, all the correction parameters stored in the flash memory 50 are collectively erased.

As has been described, the user specifies at least one correction parameter of a plurality of correction parameters (grid and dust information) stored in the flash memory 50 with his/her finger FG, and the at least one correction parameter thus specified is erased from the flash memory 50. As a result, it is possible to prevent the unnecessary grid and dust removal correction from being carried out for the image of the grid and dust which has appeared no longer on the photographed image because the grid and dust are physically removed.

Figure 14:
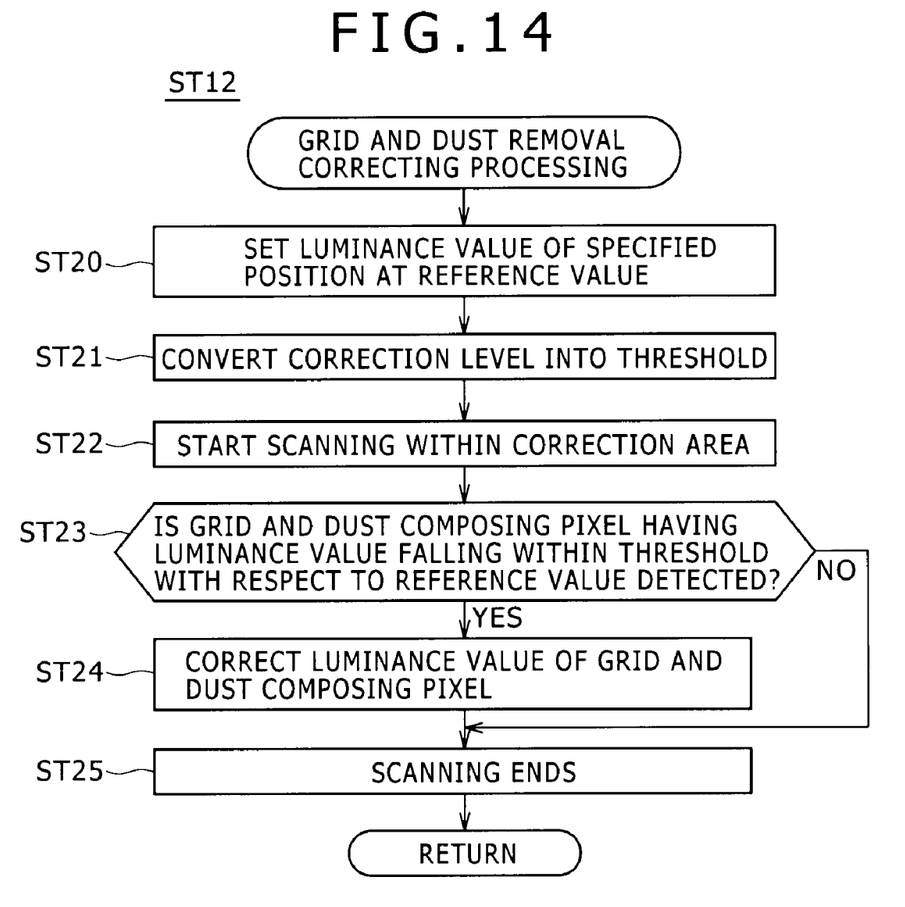
FIG. 14 is a flow chart explaining grid and dust removal correcting processing.

FIG. 14 is a flow chart explaining processing corresponding to the processing in Step ST12 shown in FIG. 5, that is, the grid and dust removal correcting processing.

In Step ST20, a luminance value of the pixel located in the specified position Pt (refer to FIG. 9) specified as the position of the image Do of the grid and dust by the user is set at the reference value R described above.

In Step ST21, the correction level inputted with the finger FG of the user is converted into the threshold described above. That is to say, the value of (the reference value R± the correction level α) set in Step ST20 is set as the threshold.

In Step ST22, the scanning is started within the correction area Hs (refer to FIG. 10) the data on which was inputted by the user. In this case, as previously stated, either the horizontal scanning shown in FIG. 4A or the vertical scanning shown in FIG. 4B can be selected by the user manipulation made for the touch panel 122.

In Step ST23, it is judged whether or not the pixel (grid and dust composing pixels) each having the luminance value falling within the threshold described above with respect to the reference value R are detected in the pixels in the scanning direction. Here, when it is judged in Step ST23 that the grid and dust composing pixels are detected, the operation proceeds to processing in Step ST24. On the other hand, when it is judged in Step ST23 that none of the grid and dust composing pixels is detected, the operation proceeds to processing in Step ST25.

In Step ST24, the luminance value of the grid and dust composing pixel is corrected based on the luminance values of the normal pixels in the periphery of the grid and dust composing pixels. Specifically, when the horizontal scanning Qh is carried out in the manner as shown in FIG. 4A, each of the luminance values of the abnormal pixels sandwiched between the pixels H1 and H2 is replaced with the average of the luminance values of the normal pixels H1 and H2 adjacent to the outer edge of the area Dp of the grid and dust composing pixels. On the other hand, when the vertical scanning Qv is carried out in the manner as shown in FIG. 4B, each of the luminance values of the abnormal pixels sandwiched between the pixels V1 and V2 is replaced with the average of the luminance values of the normal pixels V1 and V2 adjacent to the outer edge of the area Dp of the grid and dust composing pixels.

In Step ST25, the scanning which is started in Step ST22 ends, thereby completing the grid and dust removal correction. It should be noted that the scanning which is started in Step ST22 and ends in Step SP25 is repetitively carried out until completion of the scanning for all the pixels within the correction area Hs.

With the image pickup apparatus 1 which has been described so far, the suitable removal of the image Do of the grid and dust by the grid and dust removal correction can be easily carried out because the position of the image Do of the grid and dust which appears on the photographed image can be specified by using the touch panel 122 while the photographed image is displayed on the display screen 12f of the back surface display portion 12.

Changes

Figure 15:
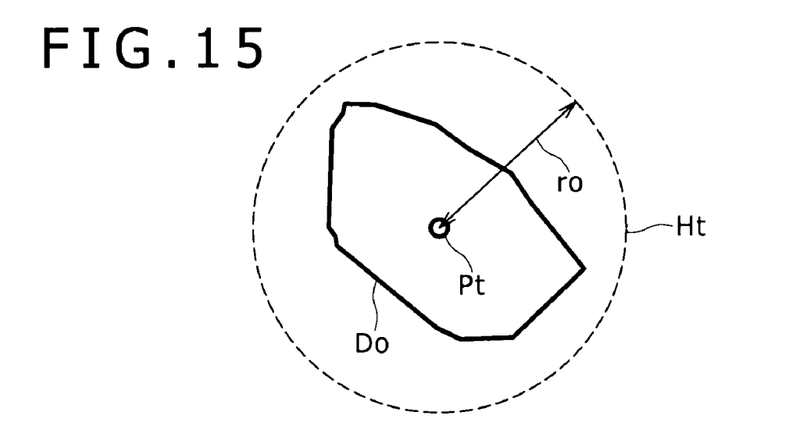
FIG. 15 is a view explaining setting of a correction area according to a change of the embodiment of the present invention.

In the embodiment described above, it is not essential to set the correction area Hs (refer to FIG. 10) based on the user manipulation made for the touch panel 122. Thus, a figure having a predetermined shape and including the position, of the image Do of the grid and dust, specified by the user may be automatically set as the correction area. For example, as shown in FIG. 15, a circle having a predetermined radius ro is set as a correction area Ht (indicated by a broken line) with the specified position Pt specified by the user as a center. As a result, it is possible to omit the user manipulation for setting the correction area, and thus it is possible to lighten a burden imposed on the user.

In the embodiment described above, it is not essential to provide the touch panel 122 in the back surface display portion 12 installed in the image pickup apparatus 1. Thus, the touch panel 122 may be provided in a monitor which is detachably connected to the image pickup apparatus 1 through a connector or the like.

In the embodiment described above, it is not essential to provide the touch panel 122 over the entire surface of the display screen 12f of the back surface display portion 12. Thus, the touch panel 122 may be provided on a part of the display screen 12f of the back surface display portion 12. In this case, when the image Do of the grid and dust is moved so as to fall within an area of the touch panel 122 in the display screen 12f of the back surface display portion 12, the specification of the position of the image Do of the grid and dust, or the like becomes possible.

In the embodiment described above, it is not essential to detect the touch position by using the touch panel 122. Thus, for example, the touch position may be optically detected by detecting a portion in which light beams, such as infrared lights, radiated in a lattice so as to cover the display screen 12f of the back surface display portion 12, or a light beam used to scan the display screen 12f of the back surface display portion 12 is blocked.

The present application contains subject matter related to that disclosed in Japanese Priority Patent Application JP 2008-145699 filed in the Japan Patent Office on Jun. 3, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An image pickup apparatus, comprising:
   an image pickup portion configured to capture an image;
   a detecting portion configured to detect a first manipulation and a second manipulation made on a display surface of a display portion, when the captured image is displayed on the display portion, the first manipulation corresponding to a correction area of the captured image;
   a luminance range setting portion configured to set a luminance range corresponding to an input time period of the second manipulation detected by said detecting portion;
   another detecting portion configured to detect a pixel group of the correction area belonging to the set luminance range as a pixel group of a foreign substance; and
   a foreign substance removing portion configured to remove an image of the foreign substance, when the captured image of the foreign substance is included in the captured image by executing image processing based on a position of the first manipulation detected by said detecting portion and the pixel group detected by said another detecting portion.

2. The image pickup apparatus according to claim 1, further comprising:
   a display control portion configured to enlarge and display the image in response to initiation of a foreign substance removal mode in which the removal of the image of the foreign substance is carried out.

3. The image pickup apparatus according to claim 1, wherein when the first manipulation defines a locus that is drawn in an annular shape on the display surface, said foreign substance removing portion executes the image processing for an area surrounded by the annular locus.

4. The image pickup apparatus according to claim 1, further comprising:
   a display control portion;
   wherein said luminance range setting portion successively sets the luminance range every predetermined time based on the input time period; and
   said display control portion instructs said display portion to successively display thereon the images for which the image processing is successively executed.

5. The image pickup apparatus according to claim 1, wherein said foreign substance removing portion executes the image processing in a region having a predetermined shape and including a position of the image of the foreign substance based on the position of the first manipulation detected by said detecting portion.

6. The image pickup apparatus according to claim 1, further comprising:
   a storage control portion configured to store foreign substance information of a position of the image of the foreign substance in a memory;
   wherein said foreign substance removing portion executes the image processing for another image captured by said image pickup portion based on the foreign substance information.

7. The image pickup apparatus according to claim 6, further comprising:
   an erasing portion configured to erase at least one piece of information specified of a plurality pieces of foreign substance information stored in said storage portion from said storage portion.

8. The image pickup apparatus according to claim 1, wherein the foreign substance is dust.

9. The image pickup apparatus according to claim 1, further comprising:
   the display portion, the display portion including a touch screen.

10. The image pickup apparatus according to claim 1, wherein the luminance range is proportional to the input time period of the second manipulation detected by said detecting portion.

11. A non-transitory computer-readable recording medium having a program recorded therein, said program being adapted to instruct a computer to perform a method comprising:
    capturing an image;
    detecting a first manipulation and a second manipulation, made on a display surface of a display portion, when the captured image is displayed on the display portion, the first manipulation corresponding to a correction area of the captured image;
    setting a luminance range corresponding to an input time period of the detected second manipulation;
    detecting a pixel group of the correction area belonging to a set luminance range as a pixel group of a foreign substance; and
    removing an image of the foreign substance, when the image of the foreign substance is included in the captured image by executing image processing based on a position of the detected first manipulation and the detected pixel group.

12. An image processing method comprising:
    capturing an image;
    detecting a first manipulation and a second manipulation, made on a display surface of a display portion, when the captured image is displayed on the display portion, the first manipulation corresponding to a correction area of the captured image;
    setting a luminance range corresponding to an input time period of the detected second manipulation;
    detecting a pixel group of the correction area belonging to a set luminance range as a pixel group of a foreign substance; and
    removing an image of the foreign substance, when the image of the foreign substance is included in the captured image by executing image processing based on a position of the detected first manipulation and the detected pixel group.

13. An image pickup apparatus, comprising:

image pickup means for capturing an image;

detecting means for detecting a first manipulation and a second manipulation made on a display surface of a display portion, when the captured image is displayed on the display portion, the first manipulation corresponding to a correction area of the captured image;

a luminance range setting means for setting a luminance range corresponding to an input time period of the second manipulation detected by said detecting portion;

another detecting means for detecting a pixel group of the correction area belonging to the set luminance range as a pixel group of a foreign substance; and removing means for removing an image of the foreign substance, when the image of the foreign substance is included in the captured image by executing image processing based on a position of the first manipulation detected by said detecting means and the pixel group detected by said another detecting means.

* * * * *